Patented Jan. 8, 1952

2,581,453

UNITED STATES PATENT OFFICE 2,581,453

HIGH-BOILING ESTERS AS SOLVENTS FOR POLYCHLOROTRIFLUOROETHYLENE

Murray M. Sprung, Schenectady, N. Y., assignor to General Electric Company, a corporation of New York No Drawing. Application November 25, 1949, Serial No. 129,531

8 Claims. (Cl. 260—29.1)

This invention is concerned with solutions of polymeric chlorotrifluoroethylene. More particularly, the invention relates to a solution comprising (1) polymeric chlorotrifluoroethylene dissolved in (2) an organic ester selected from the class consisting of dibutyl phthalate, dibutyl sebacate, butyl stearate, dibutyl adipate, dioctyl sebacate, methyl stearate, tributyl citrate, tributyl tricarballylate, acetyl tributyl citrate, dihexyl tetrachlorophthalate, dioctyl tetrachlorophthalate (including its isomers, e. g., di-(2-ethylhexyl) tretrachlorophthalate), triethylene glycol di-(2-ethylhexoate), beta-naphthyl benzoate, and mixtures thereof. The invention also embraces methods of making the above described solutions.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of about 150 to 200° C. for long periods of time with little change in the physical characteristics or the insulating properties of the polymeric insulation. Such polymeric material is also highly desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance, high flow point and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene but these have generally been unsuccessful because the limit of solubility of the polymeric chlorotrifluoroethylene in the solvent has been so small as to render it impractical.

I have now discovered that I am able to make solutions of polymeric chlorotrifluoroethylene (using any solid polymer thereof) whereby it is possible to obtain concentrations of the latter polymer in the solution in sufficiently large amounts as to make them useful in many coating and impregnating applications. By means of my invention it is possible to obtain solutions containing at least ten per cent, by weight, solids of the polymeric chlorotrifluoroethylene, whereas formerly the solubility of the polymer in other solvents has been negligible.

In addition to the advantages described above for my invention, I have also found that such solutions are accompanied by still further advantages. Among these are the ability to deposit more uniform and more homogeneous coatings on such materials as electrical conductors, particularly magnet wire. In addition, these hot solutions have a definite advantage over the use of some dispersions or suspensions of polymeric chlorotrifluoroethylene since, by means of application of the polymer from hot solutions, the deposited film is continuous and requires no fusion at elevated temperatures to cause coalescence of the individual particles in the coating. When employing dispersions, high temperatures are necessary to cause fusion of the individual particles which, although closely packed together, are nevertheless not continuous. Also, when applying coatings on magnet wire by means of the above-described solution, conventional magnet wire dies can be used, permitting a more uniform build-up of film thickness. Finally, because of the lower temperatures at which coating of various materials can be effected, thermal effects on the polymer are minimized.

I am aware that U. S. Patent 2,448,952 discloses solutions of copolymers of tetrafluoroethylene and ethylene in high boiling esters at temperatures above 175° C. However, the use of such esters with high polymeric tetrafluoroethylene alone for making solutions of the latter is not feasible and it is only because of the presence of the copolymerized ethylene that it is possible to make solutions at all of the copolymers of tetrafluoroethylene and ethylene. Because of the foregoing poor solubility of polymeric tetrafluoroethylene in the high boiling organic esters, it was unexpected and in no way could have been predicted that polymeric chlorotrifluoroethylene could be caused to dissolve in similar organic esters to give solutions having a relatively high concentration of polymer. Unexpectedly, it was found that many esters, e. g., ethyl acetate, amyl acetate, diethyl oxalate, dimethyl succinate, dimethyl adipate, dioctyl phthalate, tributyl phosphate, ethyl benzoate, diethyl adipate, etc., did not dissolve the polymeric chlorotrifluoroethylene even at the boiling point of the ester. It therefore could in no way have been predicted that the class of esters described previously would act as solvents for polymeric chlorotrifluoroethylene to give homogeneous solutions of relatively high concentration.

In accordance with my invention, I prepare a mixture of finely divided polymeric chlorotrifluoroethylene and the high boiling organic ester and heat the mixture at a temperature sufficiently high to cause the polymer to dissolve in the solvent. Generally, I have found that solution in the particular class of solvents employed herein takes place at a relatively high point somewhat below the boiling point of the solvent. I have found that for most ten per cent concentrations of the polymer, this solution temperature in many cases occurs around 250° to 325° C., depending, of course, on the solvent used, the amount of polymer employed, etc. By maintaining these solutions at the temperatures at which solution of the polymer has taken place, I am able to employ these solutions in the same manner as solutions of other better known polymers. If the temperature is allowed to drop much below the solution temperature, small amounts of the polymer will begin to settle out with increasing amounts settling out as the temperature of the solution is allowed to fall. In spite of this, however, this is believed to be the first time that it has been possible to obtain solutions of such relatively high concentrations of the high polymeric chlorotrifluoroethylene even at elevated temperatures.

The esters employed in the practice of the present invention may be generally defined as organic esters having boiling points above 250° C. These include such compounds as, for example, butyl stearate, dibutyl adipate, dibutyl sebacate, di-(2-ethylhexyl) tetrachlorophthalate, dihexy tetrachlorophthalate, triethyleneglycol, di-(2-ethylhexoate), dibutyl phthalate, tributyl tricarballylate, methyl stearate, tributyl citrate, acetyl tributyl citrate, tricresyl phosphate and beta-naphthyl benzoate. The particular virtue of these solvents lies in the fact that they have relatively high boiling points (around 250° to 350° C.) so that they are substantially non-volatile at the solution temperatures.

In employing the organic esters as solvents for the polymeric chlorotrifluoroethylene, certain precautions must be observed. Because of the high temperature at which solution takes place, some effect on the polymer is noted if the solution is maintained at this high temperature for too long a time. Under such circumstances operations involving such solutions would have to be carried out as rapidly as possible. There are many instances where a rapid heat treatment is all that is required and for such operations the herein disclosed and claimed solutions would be adequate.

In order that those skilled in the art better may understand how the present invention may be practiced, the following example is given by way of illustration and not by way of limitation. In each of the various cases described in the example, sufficient polymer and solvent were employed so that there was obtained a ten per cent solution of the polymer in the particular solvent. Generally, the procedure for making the various solutions was the same. This comprised mixing 10 per cent, by weight, of the high polymeric chlorotrifluoroethylene (no strength temperature about 245° C.) with 90 per cent, by weight, of the particular solvent and heating the mixture until solution thereof took place. The temperatures at which solution took place at atmospheric pressure are noted in each of the examples for the respective solvents employed.

EXAMPLE

In this example the following organic esters were mixed with polymeric chlorotrifluoroethylene with the results described in the table.

Table

| Compound | For 10% Solutions—Solution Temp., (° C.) |
|---|---|
| Di-(2-ethylhexyl) tetrachlorophthalate | 300–310 |
| Triethylene glycol di-(2-ethylhexoate) | 290–300 |
| Dihexyl tetrachlorophthalate | 310–320 |
| Dibutyl phthalate | 305 |
| Dibutyl adipate | 290 |
| Dibutyl sebacate | 300 |
| Dioctyl sebacate | 290–300 |
| Butyl stearate | 310 |
| Methyl stearate | 300–310 |
| Tributyl citrate | 300–310 |
| Beta-naphthyl benzoate | 310–320 |
| Tributyl tricarballylate | 305 |
| Acetyl tributyl citrate | 290–300 |

It will, of course, be apparent to those skilled in the art, that although the foregoing examples are all concerned with making solutions having a concentration of ten per cent, by weight, of polymeric chlorotrifluoroethylene, lower or higher concentrations of the polymer may also be employed. Thus, I may prepare solutions varying in concentration from about one to twenty per cent, by weight, of polymer, based on the total weight of the solution. In such cases where lower concentrations of the polymer are desired, it will be found that somewhat lower temperatures of solution will be encountered while the converse, that is, somewhat higher temperatures of solution may be needed when the concentration of the polymer rises substantially above ten per cent.

In addition to the requirement for higher solution temperatures where concentrations greater than ten per cent of polymer are desired, it will also be noted that the viscosity of the solution will begin to increase materially. However, in many instances this disadvantage can be obviated by raising the temperature of the solution (if the solvent permits this) to a point where a satisfactory viscosity is attained. All these factors which have been mentioned above can be balanced to give solutions of polymeric chlorotrifluoroethylene which have satisfactory concentration of polymer, viscosity, and operating temperature range.

The claimed solutions have utility in many applications and may be employed in various ways. They may be used to coat and impregnate various fillers, such as, for example, glass cloth, glass batting, asbestos cloth or asbestos floats, mica, etc. In addition, the solutions are advantageously employed for coating electrical conductors to give heat resistant and chemical resistant insulations for such conductors. If desired, molding compositions may be advantageously prepared by adding various inorganic fillers to obtain a homogeneous mixture and thereafter removing the solvent from the mixture. Laminated products may also be prepared by coating and impregnating sheet material with the solutions and superposing layers of the impregnated and coated material and pressing the total assembly under heat and pressure (after the solvent has been removed from the treated sheet material), thereby to cause fusing of the polymer and to give a homogeneous article.

What I claim as new and desire to secure by Letters Patent of the United States is:

1. A solution comprising (1) a solute phase consisting essentially of polychlorotrifluoroethylene and (2) a solvent phase comprising a high boiling organic ester selected from the class consisting of dibutyl phthalate, dibutyl sebacate, butyl stearate, dibutyl adipate, dioctyl sebacate, methyl stearate, tributyl citrate, tributyl tricarballylate, acetyl tributyl citrate, dihexyl tetrachlorophthalate, dioctyl tertachlorophthalate, triethylene glycol di-(2-ethylhexoate), and beta-naphthyl benzoate, the solvent phase being maintained at the temperature at which solution of the solute phase takes place.

2. A solution comprising (1) a solute phase consisting essentially of polychlorotrifluoroethylene and (2) a solvent phase comprising dibutyl phthalate maintained at the temperature at which solution of the solute phase takes place.

3. A solution comprising (1) a solute phase consisting essentially of polychlorotrifluoroethylene and (2) a solvent phase comprising butyl stearate maintained at the temperature at which solution of the solute phase takes place.

4. A solution comprising (1) a solute phase consisting essentially of polycholortrifluoroethylene and (2) a solvent phase comprising dibutyl sebacate maintained at the temperature at which solution of the solute phase takes place.

5. The method of making a solution of polymeric chlorotrifluoroethylene which comprises (1) forming a mixture of ingredients comprising (a) finely divided polychlorotrifluoroethylene as the sole polymeric ingredient and (b) a high boiling organic ester selected from the class consisting of dibutyl phthalate, dibutyl sebacate, butyl stearate, dibutyl adipate, dioctyl sebacate, metyl stearate, tributyl citrate, tributyl tricarballylate, acetyl tributyl citrate, dihexyl tetrachlorophthalate, dioctyl tetrachlorophthalate, triethylene glycol di-(2-ethylhexoate), and beta-naphthyl benzoate, and (2) heating the mixture of ingredients at a temperature above 250° C. sufficient to cause solution of the polymer in the solvent.

6. The method of making a solution of polymeric chlorotrifluoroethylene which comprises (1) forming a mixture of ingredients comprising (a) finely divided polychlorotrifluoroethylene as the sole polymeric ingredient and (b) dibutyl phthalate, and (2) heating the mixture of ingredients at a temperature above 250° C. sufficient to cause solution of the polymer in the solvent.

7. The method of making a solution of polymeric chlorotrifluoroethylene which comprises (1) forming a mixture of ingredients comprising (a) finely divided polychlorotrifluoroethylene as the sole polymeric ingredient and (b) butyl stearate, and (2) heating the mixture of ingredients at a temperature of at least 250° C. sufficient to cause solution of the polymer in the solvent.

8. The method of making a solution of polymeric chlorotrifluoroethylene which comprises (1) forming a mixture of ingredients comprising (a) finely divided polychlorotrifluoroethylene as the sole polymeric ingredient and (b) dibutyl sebacate, and (2) heating the mixture of ingredients at a temperature of at least 250° C. sufficient to cause solution of the polymer in the solvent.

MURRAY M. SPRUNG.

REFERENCES CITED

The following references are of record in the file of this patent:

UNITED STATES PATENTS

| Number | Name | Date |
|---|---|---|
| 2,484,483 | Berry | Oct. 11, 1949 |